UNITED STATES PATENT OFFICE.

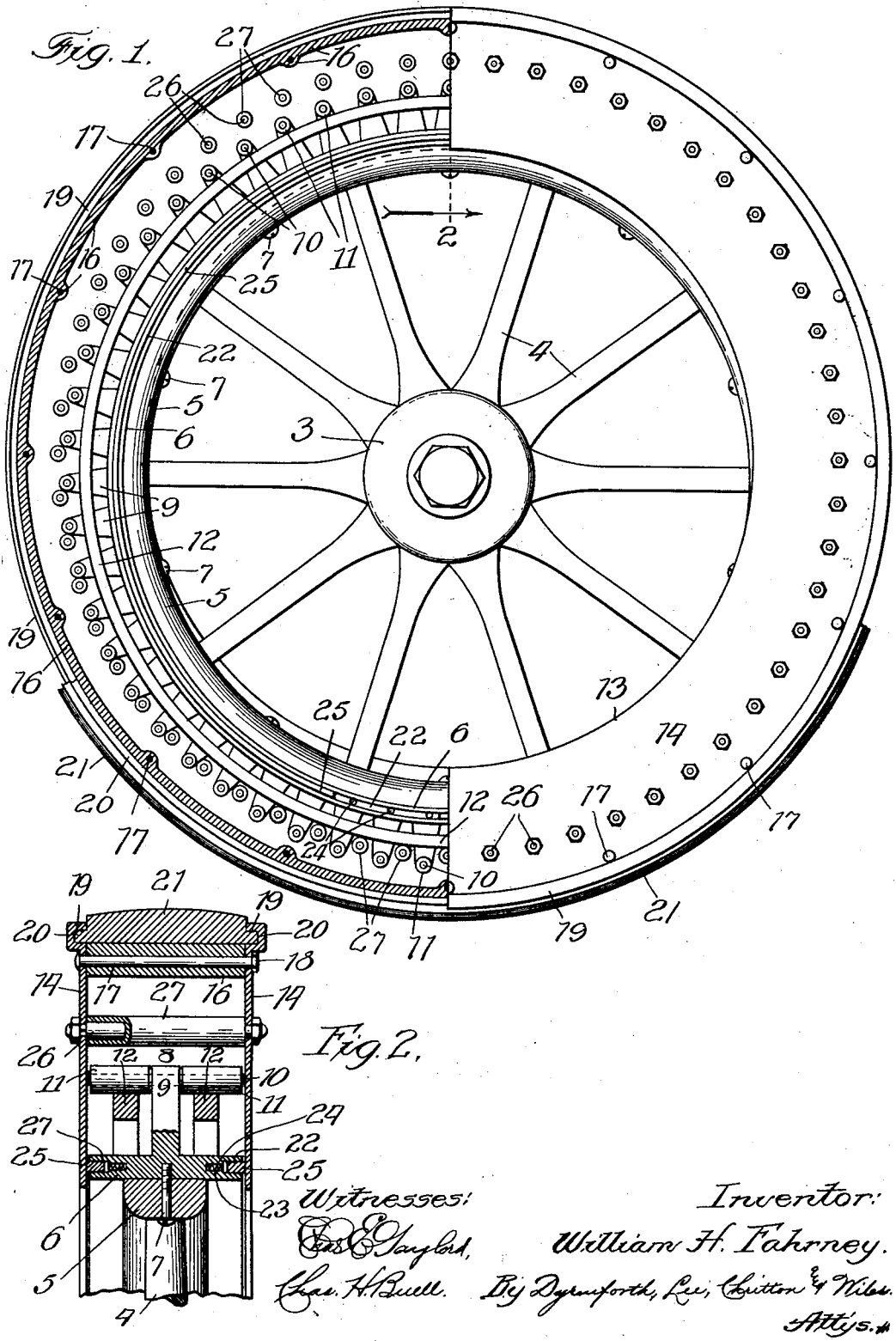

WILLIAM H. FAHRNEY, OF CHICAGO, ILLINOIS.

SPRING VEHICLE-WHEEL.

998,241.  Specification of Letters Patent.  Patented July 18, 1911.

Application filed February 13, 1911. Serial No. 608,220.

*To all whom it may concern:*

Be it known that I, WILLIAM H. FAHRNEY, a citizen of the United States, residing at Chicago, in the county of Cook and State of Illinois, have invented a new and useful Improvement in Spring Vehicle-Wheels, of which the following is a specification.

My invention relates to spring vehicle-wheels of the class exemplified in Letters Patent No. 979,269, granted to me December 20, 1910; and it is intended, primarily, as an improvement, in matters of detail, upon the construction set forth in said patent to attain the objects hereinafter explained.

In the accompanying drawing, Figure 1 is a view in side elevation, partly sectional, of a wheel embodying my improvements, and Fig. 2 is an enlarged broken section on line 2, Fig. 1.

The wheel-center shown comprises a hub 3 with radiating spokes 4 carrying the felly 5; but it may involve any other suitable construction. The felly is surrounded by a metal band 6, forming the wheel-rim, which is fastened in place, as by screw-bolts 7 at intervals; and the rim has radiating from it a circumferential series of projections 8 of general T-shape, with outwardly-tapering stems 9, as in my said patent, but with the head 10 of each T forming, at opposite sides of the stem, bearings for similar rollers 11, 11. Annular spring bands 12, in any desired number, and which are preferably endless, encircle the rim and are confined, by expansion, against the rollers 11.

The tire-portion 13 is formed of two similar annular plates 14, 14, spaced apart by an annular metal tire-band 15 provided at uniform intervals about its edges with inwardly-projecting eyes 16 for tie-bolts 17 fastened by nuts 18 at one side of the wheel. Beyond the band 15 the plates have their edge-portions formed into annular circumferential recesses 19 to receive and clamp between them, at its reduced edges 20, a solid-rubber tire 21. The rim 6 has annular recesses 22 formed centrally in its edge-portions, with chambers 23 at intervals in their bases for housing spiral springs 24, against the washer-equipped outer ends of which are confined, in the recesses, flexible rings 25, preferably of rubber, to bear against the surfaces of the respective plates 14 and form dust-guards. At intervals about the plates coinciding with the spaces between the projections having the rollers 11, are secured at their squared end-portions, in openings in the plates, cylindrical rods 26, fastened by nuts on their projecting ends to reinforce the tire-structure, and carrying rollers 27 forming projections on the tire to take the place of those of my aforesaid patent for bearing against the load-carrying springs 12.

In the use of the wheel, the load carried by it causes the tire-portion, where the band 21 contacts with the roadbed to compress the projections 27 at and adjacent to that point against the springs 12, which are unsupported against inward compression, thereby resiliently cushioning the motion of the wheel with resultant ease in riding. The roller-form of the projections on the rim and tire enhances the tendency of the springs under the action against them of the rollers to creep, and facilitates their creeping, with the advantage of distributing the wear by the projections upon the springs 12 over their surfaces and increasing their durability.

The wheel provided with my improvements, herein described also embodies the principle set forth in my Patent No. 983,612, dated February 7, 1911, of a greater number of the projections about the tire than about the rim.

As is apparent from the showing in Fig. 1, the sectional portion thereof shows twenty-nine of the tire projections 27 and only twenty-eight of the rim projections 8, thus indicating the fact that the number of the former provided in the wheel exceeds that of the latter by one.

What I claim as new and desire to secure by Letters Patent is—

1. In an elastic vehicle-wheel, the combination with a wheel-center, of a rim provided with radially-extending spaced projections comprising stems terminating in heads forming rollers-bearings and rollers journaled on said bearings, spring-bands extending about the rim under and confined by expansion against said rollers, and an annular tire-portion surrounding the rim and provided with internal rollers forming projections registering with the spaces between said heads to engage the spring-bands through said spaces, for the purpose set forth.

2. In an elastic vehicle-wheel, the combination with a wheel-center, of a rim provided with radially-extending spaced projections, annular spring-bands extending about the rim under and confined by expansion against said projections, a tire comprising a pair of annular plates with a tire-band between them, and having recesses about their outer edges beyond said band, a solid rubber tire confined in said recesses, bolts extending at intervals through said plates to secure them in their spaced relation, and rollers on said bolts forming projections to coöperate with said springs in the spaces between the rim-projections and elastically support the tire.

WILLIAM H. FAHRNEY.

In the presence of—
A. U. THORIEN,
R. A. SCHAEFER.

Copies of this patent may be obtained for five cents each, by addressing the "Commissioner of Patents, Washington, D. C."